S. MARCH.
Shovel-Plow.
No. 63,912.
Patented Apr. 16, 1867.
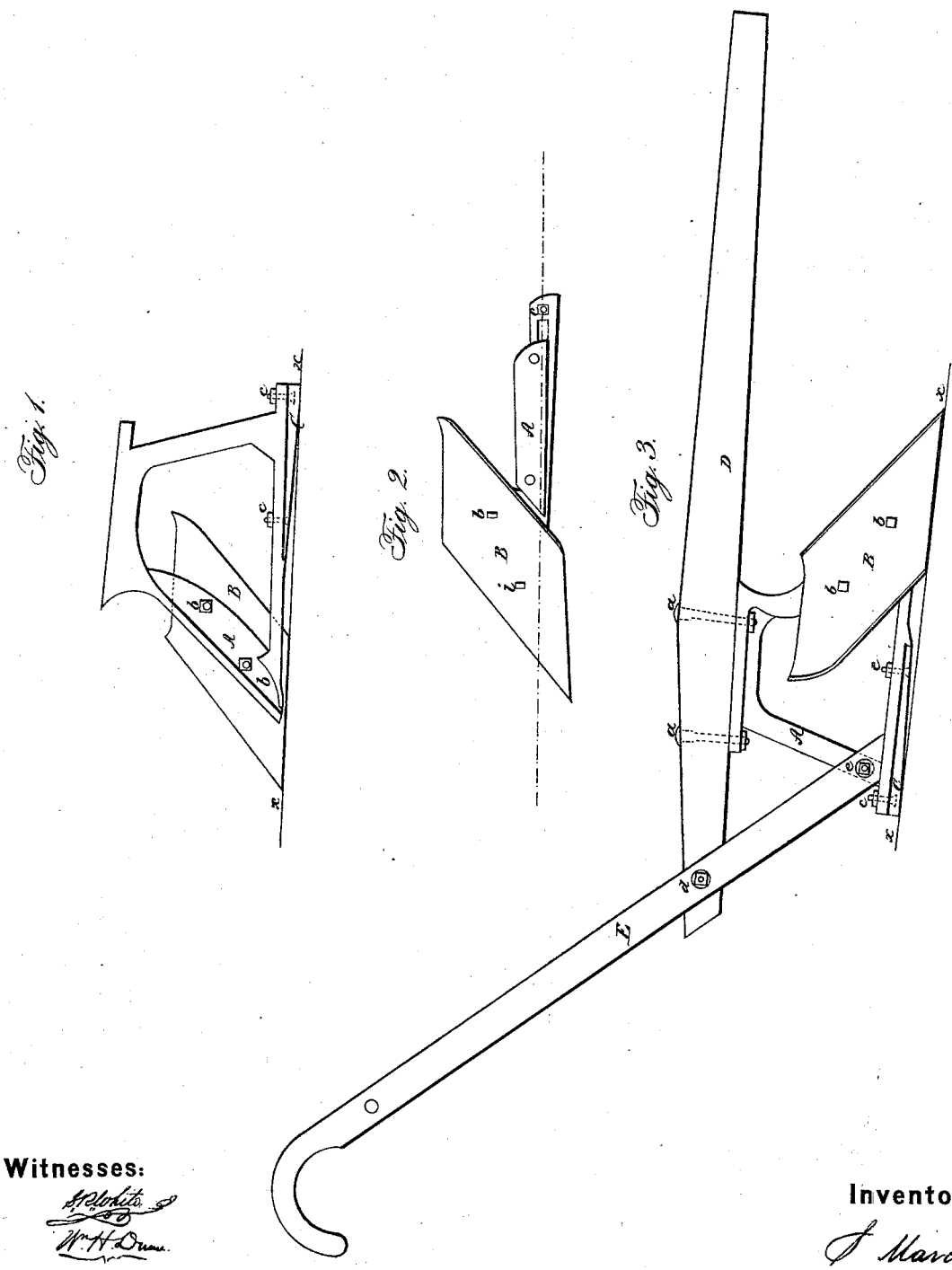

United States Patent Office.

SETH MARCH, OF NORFOLK, VIRGINIA.

Letters Patent No. 63,912, dated April 16, 1867.

---

IMPROVEMENT IN CORN-WEEDER.

---

The Schedule referred to in these Letters Patent and making part of the same.

---

Be it known that I, SETH MARCH, of Norfolk, in the county of Norfolk, in the State of Virginia, have invented a new and useful Improvement in Corn-Weeders; and I do hereby declare that the following is a full and exact description thereof, reference being had to the accompanying drawings, and to the letters of reference marked thereon.

The blue lines in the drawings represent the wood parts of the weeder, and the black lines the iron parts.

Figure 1 represents a longitudinal vertical view of the left or land-side of the skeleton, or iron work alone.

Figure 2 is a longitudinal and transverse section of skeleton, taken in the line $x\ x$ of figs. 1 and 3.

Figure 3 gives a longitudinal and vertical view of the right or mould-board side of the weeder, stocked.

A is a cast-iron frame, to which the other parts of the weeder are attached; B, the mould-board, fits to front or standard part of frame, and is firmly secured thereto by means of the two plough-bolts $b$. C is a heel, fitted under bar part of frame and secured to it by the plough-bolts $c$. D is the beam, secured to frame by the carriage-bolts $a$. E, the handles, are like ordinary plough-handles; they pass closely on either side of rear end of beam, and are tightly fastened thereto by the carriage-bolt $d$; then continuing downwards terminate at the junction of the brace part with the bar part of frame, to which they are secured by the carriage-bolt $e$, all of which is plainly shown in fig. 3.

The above explanation, with due reference to the accompanying drawings, will be sufficient, I think, to give any one who is at all acquainted with the use of farming tools a distinct understanding of how the machine is made. Therefore I will only add that this machine is intended, as its name indicates, to be used for weeding or scraping the grass from young corn, cotton, or vegetables generally, when in cultivation, and then will proceed at once with a description of my improvements. First I must state, however, that there has been in use for several years past a weeder, or scraper as some call it, which I do not profess to have invented, but only claim to have made very important improvements on it. My improvement may be readily distinguished by its having a much longer bar or land-side, and by being so constructed as that the handles extend below the beam to lower part of frame, all of which is plainly shown in fig. 3.

The advantages of my weeder over all others that have been in use I will endeavor to show in the following statement of particulars:

In similar weeders heretofore in use the land-side (or bar part of frame) has been so short that the weeder could not be steered straightly, and therefore the vegetables that it was intended to weed were frequently taken up along with the grass by sudden breaches of the weeder from the desired course or direction. In my improvement the bar or land-side is so lengthened that the weeder can be run as near the vegetable as may be desired, and so steadily as to only weed off what is required without injury to the plants; and this has been so admirably effected by opening and bracing the frame as to lighten it of all its superfluous weight, and to properly adjust its symmetry and proportions, as any one who is acquainted with those heretofore in use can readily see by reference to the drawings of my improvement.

Again, the handles of all other similar weeders are only secured at their lower ends to the beam. This causes a great lack of strength and firmness in the stocking. In my improvement, by the bar being extended and the frame having a bolt hole through it, the handles extend well below the beam, and are additionally secured to frame by the carriage-bolt $e$, as is clearly shown in fig. 3. This gives the handles a fine leverage and promotes that firmness of stocking which so strongly characterizes my improvement. Then, besides, I have added to mine the heel C, which is similar to my invention, as a part of my late improvement in ploughs. Heretofore, the bar part soon wearing out by use, the whole frame became unserviceable, when a new one had to be gotten at an expense of several dollars. This heel will wear as long and well as the frame would without it. It completely protects the bar part, which causes the frame to wear indefinitely, and then when worn out can be replaced at a cost of only a few cents. I think this addition a very important improvement, and think that my weeder will scarcely ever be used without it; nevertheless I will state that mine can be readily used without the heel, and will run infinitely better than, and wear as long as, any other that I have ever known to be in use without it.

What I claim as my improvement, and desire to secure by Letters Patent, is—

The frame A, share B, and detachable heel C, when these parts are constructed, arranged, and combined as herein specified.

S. MARCH.

Witnesses:
S. R. WHITE,
WM. H. DUNN.